US 9,314,851 B2

(12) United States Patent
Hecht

(10) Patent No.: US 9,314,851 B2
(45) Date of Patent: Apr. 19, 2016

(54) CUTTING INSERT HAVING A REARWARDLY OFFSET CUTTING EDGE AND CUTTING TOOL

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 511 days.

(21) Appl. No.: 13/899,160

(22) Filed: May 21, 2013

(65) Prior Publication Data

US 2014/0348601 A1    Nov. 27, 2014

(51) Int. Cl.
  *B23B 27/00*   (2006.01)
  *B23B 27/16*   (2006.01)
  *B23B 29/04*   (2006.01)
  *B23B 27/08*   (2006.01)

(52) U.S. Cl.
  CPC ......... *B23B 27/1611* (2013.01); *B23B 27/1622* (2013.01); *B23B 29/043* (2013.01); *B23B 2200/0447* (2013.01); *B23B 2200/0452* (2013.01); *B23B 2200/3618* (2013.01); *B23B 2200/3627* (2013.01); *B23B 2205/04* (2013.01); *Y10T 407/22* (2015.01); *Y10T 407/2276* (2015.01); *Y10T 407/23* (2015.01)

(58) Field of Classification Search
  CPC ..................... B23B 29/043; B23B 2200/3618; B23B 2200/0471; B23B 2200/0447; B23B 2200/0452; B23B 2200/3627; B23B 2205/12; B23B 2205/04
  See application file for complete search history.

(56) References Cited

U.S. PATENT DOCUMENTS

| 6,612,207 | B2 | 9/2003 | Schiffers |
| 6,942,434 | B2 | 9/2005 | Friedman et al. |
| 7,597,508 | B2 * | 10/2009 | Hecht ..................... B23B 27/04 407/101 |
| 7,682,109 | B2 | 3/2010 | Hecht et al. |
| 9,103,418 | B2 * | 8/2015 | Hecht ................. B23B 27/1622 |
| 2001/0022123 | A1 | 9/2001 | Schiffers |
| 2003/0156910 | A1 | 8/2003 | Friedman et al. |
| 2003/0165362 | A1 * | 9/2003 | Hecht ..................... B23B 27/08 407/107 |
| 2011/0255926 | A1 | 10/2011 | Hecht |
| 2012/0099935 | A1 * | 4/2012 | Hecht ................. B23B 27/1614 407/100 |

OTHER PUBLICATIONS

International Search report dated Oct. 13, 2014 issued in PCT counterpart application (No. PCT/IL2014/050388).

* cited by examiner

*Primary Examiner* — Will Fridie, Jr.
(74) *Attorney, Agent, or Firm* — Womble Carlyle

(57) ABSTRACT

A cutting insert includes opposing forward and rear surfaces and a peripheral surface extending therebetween. The peripheral surface includes opposing side surfaces and opposing upper and lower surfaces. The upper surface and the forward surface intersect to form a main cutting edge having an associated relief surface that extends therefrom in the forward surface. One of the side surfaces comprises an insert side abutment surface. The rear surface comprises an insert rear abutment surface. The lower surface comprises an insert lower abutment surface. The insert rear and insert lower abutment surfaces form an obtuse abutment angle with respect to each other. In a side view along a side axis, a relief surface line tangent to the relief surface intersects the insert lower abutment surface.

30 Claims, 7 Drawing Sheets

CUTTING INSERT HAVING A REARWARDLY OFFSET CUTTING EDGE AND CUTTING TOOL

FIELD OF THE INVENTION

The subject matter of the present application relates to cutting tools, and in particular, to grooving and parting cutting tools of the type in which a cutting insert is removably attached to an insert holder by a fastening member.

BACKGROUND OF THE INVENTION

A cutting tool for metalworking operations may comprise a cutting insert removably attached to an insert holder. The cutting insert may be provided with a plurality of cutting portions, each having at least one cutting edge. Generally speaking, only one of the cutting portions is operative (or, "active") at any given time while the remaining portions are regarded as "inoperative" or "non-active".

Examples of such cutting tools are disclosed in, for example, US 2011/0255926, U.S. Pat. No. 6,612,207, U.S. Pat. No. 6,942,434 and U.S. Pat. No. 7,682,109.

During said metalworking operations a cutting force is applied on the cutting insert at the cutting edge. The direction of the cutting force is substantially downwards and somewhat inwards towards the central body. The said cutting force generates a torque about a pivot point, the pivot point typically being a forwardmost abutment point between a lower surface of the cutting insert and a lower supporting surface of the insert holder. The torque forces the cutting insert to rotate in a rotational direction about the pivot point thereby urging the lower abutment surface on the cutting insert away from the lower supporting surface on the insert holder. To prevent the rotational displacement of the cutting insert, the insert holder has an abutment surface that faces against the rotational direction.

SUMMARY OF THE INVENTION

In accordance with a first aspect of the subject matter of the present application there is provided a cutting insert having an insert longitudinal axis, the cutting insert comprising:
  opposing forward and rear surfaces and a peripheral surface extending therebetween, the peripheral surface comprising opposing side surfaces connecting opposing upper and lower surfaces; and
  an insert through bore passing through the side surfaces along a side axis; wherein
    the forward and upper surfaces intersect to form a main cutting edge having an associated relief surface that extends therefrom in the forward surface;
    one of the side surfaces comprises an insert side abutment surface;
    the rear surface comprises an insert rear abutment surface;
    the lower surface comprises an insert lower abutment surface; and
    the insert rear and lower abutment surfaces form an obtuse abutment angle with respect to each other; wherein
      in a side view of the cutting insert along the side axis, a relief surface line tangent to the relief surface intersects the insert lower abutment surface.

In accordance with a second aspect of the subject matter of the present application there is further provided a cutting tool comprising, in combination, an insert holder having a holder longitudinal axis and the aforementioned cutting insert releaseably retained therein by a fastening member. The insert holder may comprise:
  a holder forward end surface and a holder peripheral surface forming a circumferential boundary thereof; and
  an insert pocket recessed in the holder peripheral surface and opening out to the holder forward end surface, the insert pocket comprising:
    a pocket side surface and a pocket peripheral wall surface oriented substantially perpendicularly thereto, the pocket side surface comprising a pocket side abutment surface, and the pocket peripheral wall surface comprising pocket rear and lower abutment surfaces.

In an assembled position of the cutting tool, the pocket lower abutment surface abuts the insert lower abutment surface, the pocket rear abutment surface abuts the insert rear abutment surface and the pocket side abutment surface abuts the insert side abutment surface.

In accordance with a third aspect of the subject matter of the present application there is yet further provided a cutting tool comprising, in combination:
  a cutting insert having an insert longitudinal axis, the cutting insert comprising:
    opposing forward and rear surfaces and a peripheral surface extending therebetween, the peripheral surface comprising opposing side surfaces connecting opposing upper and lower surfaces;
    an insert through bore passing through the side surfaces along a side axis; wherein
      the forward and upper surfaces intersect to form a main cutting edge having an associated relief surface that extends therefrom in the forward surface;
      one of the side surfaces comprises an insert side abutment surface;
      the rear surface comprises an insert rear abutment surface;
      the lower surface comprises an insert lower abutment surface; and
      the insert rear and lower abutment surfaces form an obtuse abutment angle with respect to each other; and
  an insert holder, having a holder longitudinal axis, comprising:
    a holder forward end surface and a holder peripheral surface forming a circumferential boundary thereof; and
    an insert pocket recessed in the holder peripheral surface and opening out to the holder forward end surface, the insert pocket comprising:
      a pocket side surface and a pocket peripheral wall surface oriented substantially perpendicularly thereto, the pocket side surface comprising a pocket side abutment surface, and the pocket peripheral wall surface comprising:
        pocket rear and lower abutment surfaces.
  In the assembled position of the cutting tool:
    the cutting insert is removably attached to the insert holder by a fastening member;
    the pocket lower abutment surface abuts the insert lower abutment surface, the pocket rear abutment surface abuts the insert rear abutment surface and the pocket side abutment surface abuts the insert side abutment surface;
    a forwardmost abutment point is formed between the insert lower abutment surface and the pocket lower abutment surface furthest from the rear surface; and
    in a side view of the cutting insert along the side axis, the main cutting edge is offset in a direction towards the rear surface, relative to the forwardmost abutment point, as measured along the insert longitudinal axis.

In accordance with a fourth aspect of the subject matter of the present application there is yet further still provided an indexable cutting insert having an insert longitudinal axis, the cutting insert comprising:

opposing forward and rear surfaces and a peripheral surface extending therebetween, the peripheral surface comprising opposing side surfaces connecting opposing upper and lower surfaces; and an insert through bore passing through the side surfaces along a side axis around which the cutting insert has 180° rotational symmetry; wherein:

the forward and upper surfaces intersect at a first insert cutting corner to form a first main cutting edge having an associated rake surface in the upper surface and an associated relief surface in the forward surface;

the rear and lower surfaces intersect at a second insert cutting corner to form a second main cutting edge having an associated rake surface in the lower surface and an associated relief surface in the rear surface;

the cutting insert has a generally parallelogram-shape in a view along the side axis; and the generally parallelogram-shape includes a short diagonal connecting the insert cutting corners and a long diagonal connecting insert non-cutting corners.

It is understood that the above-said is a summary, and that features described hereinafter may be applicable in any combination to the subject matter of the present application, for example, any of the following features may be applicable to the cutting insert or the cutting tool.

The obtuse abutment angle can be in the range $110° \leq \alpha \leq 125°$.

The insert rear and lower abutment surfaces can be planar.

The insert side abutment surface can be planar.

The insert lower abutment surface can extend longitudinally in the direction of the insert longitudinal axis.

In a side view of the cutting insert along the side axis, a main cutting edge line oriented perpendicularly to the insert longitudinal axis and passing through the main cutting edge can intersect the insert lower abutment surface.

In a side view of the cutting insert along the side axis, the upper and lower surfaces can be substantially parallel and define a cutting insert height, measured perpendicular to the insert longitudinal axis.

The cutting insert has a maximum cutting insert length, measured in a direction of the insert longitudinal axis. The maximum cutting insert length L can be in the range $H \leq L \leq 2H$.

In a side view of the cutting insert along the side axis, an imaginary circle, having a radius which is greater than the cutting insert height, and which is positioned such that its circumference touches the main cutting edge at a circumference point having a circle tangent line that is perpendicular to the insert longitudinal axis, may not intersect the forward surface.

In a side view of the cutting insert along the side axis, the forward surface can comprise a forward concave portion, a forward convex portion and a forward straight portion extending therebetween, where the forward concave portion is located adjacent the relief surface and the forward convex portion is located adjacent the lower surface.

In a side view of the cutting insert along the side axis, the relief surface line can intersect the forward straight portion proximate the forward concave portion.

In a side view of the cutting insert along the side axis, the forward straight portion can be oriented at an acute forward surface angle with respect to the insert lower abutment surface.

The acute forward surface angle $\beta$ can be in the range $55° \leq \beta \leq 70°$.

The cutting insert can comprise two main cutting edges.

The cutting insert can have two-fold, 180° rotational symmetry about the side axis.

In a side view of the cutting insert along the side axis the cutting insert can be generally parallelogram-shaped. The main cutting edge can be located at an insert cutting corner of the cutting insert having an obtuse angle.

Each side surface can comprise a side clearance surface extending between the upper and lower surfaces and extending from a side raised surface towards the forward surface, the side clearance surface being recessed relative to the side raised surface, in a front view of the cutting insert.

In a side view of the cutting insert along the side axis, a clearance surface boundary of the side clearance surface adjacent the side raised surface, on each side surface, can be convex in the direction of the side axis.

The cutting insert can be one selected from a group consisting of a grooving insert, a threading insert, a profiling insert and a parting insert.

The forward and upper surfaces can be devoid of any abutment surfaces.

The pocket side surface can comprise a threaded pocket bore and the fastening member can be a screw.

In a side view of the cutting tool along the side axis, the relief surface line can intersect the pocket lower abutment surface.

In a side view of the cutting tool along the side axis, a main cutting edge line oriented perpendicularly to the insert longitudinal axis and passing through the main cutting edge can intersect the pocket lower abutment surface.

The insert longitudinal axis and the holder longitudinal axis can extend in the same direction.

Each side surface can comprise a side clearance surface extending between the upper and lower surfaces and extending from a side raised surface towards the forward surface, the side clearance surface being recessed relative to the side raised surface, in a front view of the cutting insert. In a side view of the cutting tool along the side axis, viewing the side surface that comprises the insert side abutment surface, the holder forward end surface may not overlap the side clearance surface.

A cutting force applied to the main cutting edge when the cutting insert engages a work piece can be opposed by both the pocket rear and pocket lower abutment surfaces.

BRIEF DESCRIPTION OF THE FIGURES

For a better understanding of the present application and to show how the same may be carried out in practice, reference will now be made to the accompanying drawings, in which.

Figure 1:
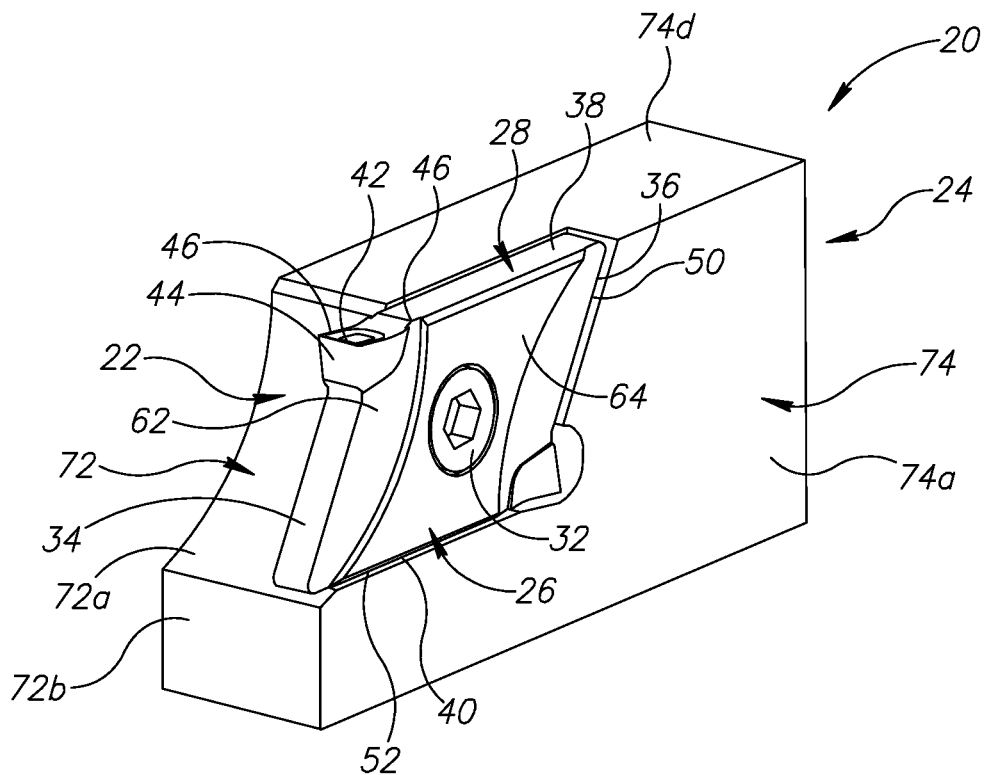
FIG. 1 is a perspective view of a cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
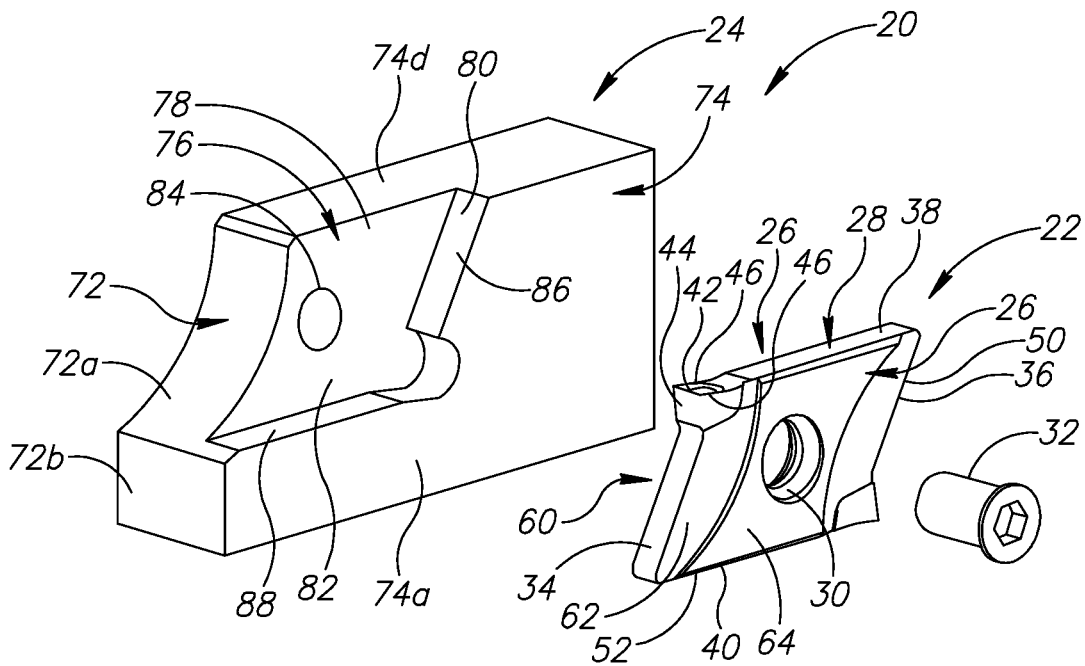
FIG. 2 is a perspective exploded view of the cutting tool shown in FIG. 1.

Attention is first drawn to FIGS. 1 and 2 showing a cutting tool 20, of the type used for grooving or parting, in accordance with an embodiment of the subject matter of the present application. The cutting tool 20 has a cutting insert 22 and an insert holder 24. The cutting tool 20 is adjustable between an assembled position and an unassembled position. In the assembled position of the cutting tool 20, the cutting insert 22 is removably attached to the insert holder 24.

The insert holder 24 may be made of a first hard material and the cutting insert 22 of a second hard material that is harder than the first hard material. For example, the insert holder 24 may be made of steel and the cutting insert 22 may be made of cemented carbide. The cutting insert 22 can be one selected from a group consisting of a grooving insert, a threading insert, a profiling insert and a parting insert.

Figure 3:
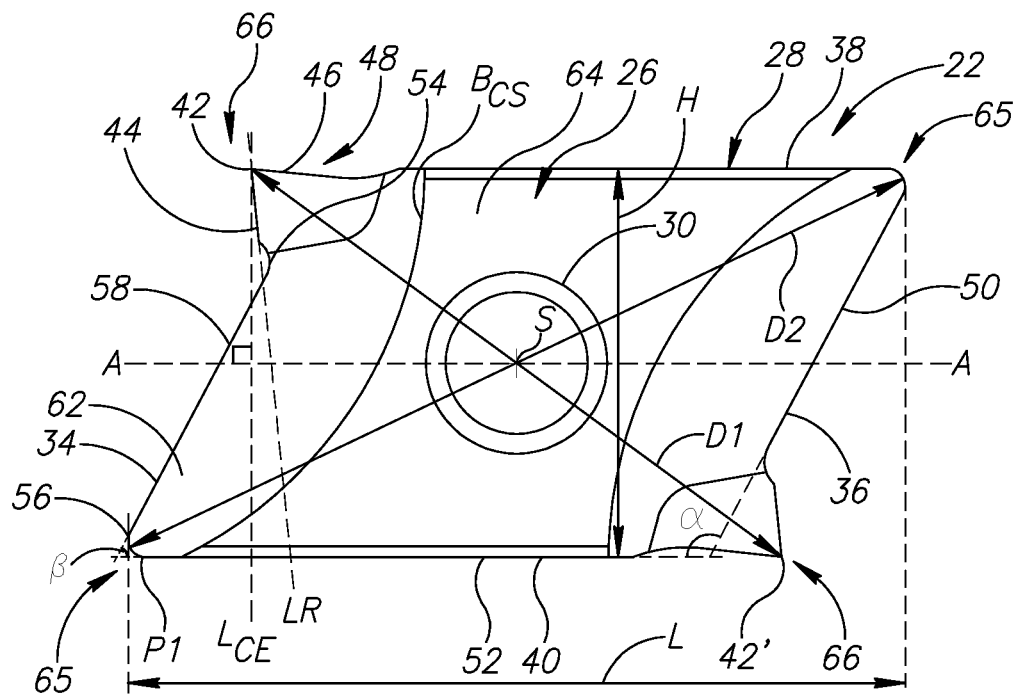
FIG. 3 is a side view of a cutting insert shown in FIG. 2.

Making reference to FIGS. 3 to 7, a first aspect of the subject matter of the present application relates to the cutting insert 22. As shown in FIG. 3, the cutting insert 22 has an insert longitudinal axis A. The cutting insert 22 includes opposing end surfaces 34, 36 (which can be considered forward and rear surfaces 34, 36, respectively) and a peripheral surface 28 that extends therebetween. The peripheral surface 28 includes opposing side surfaces 26 that connect opposing upper and lower surfaces 38, 40. An insert through bore 30 passes through the side surfaces 26 along a side axis S. The insert through bore 30 is for removably attaching, e.g. clamping, the cutting insert 22 to the insert holder 24, by use of a fastening member 32.

Figure 6:
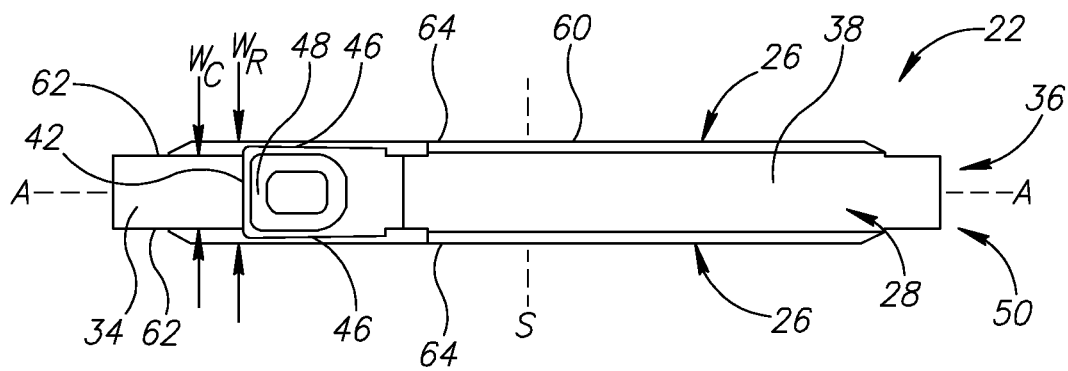
FIG. 6 is a plan view of the cutting insert shown in FIG. 2.

The forward and upper surfaces 34, 38 intersect to form a main cutting edge 42 that has an associated relief surface 44 that extends therefrom in the forward surface 34, in which it is included. Referring to FIG. 6, the upper surface 38 intersects with each side surface 26 at a region adjacent the main cutting edge 42, respectively, to form two side cutting edges 46.

As seen in the figures, the cutting insert 22 includes two main cutting edges, a first main cutting edge 42, formed at the intersection of the forward and upper surfaces 34, 38, and a second main cutting edge 42', formed at the intersection of the rear and lower surfaces 36, 40. Such a cutting insert 22 is 180° indexable about the side axis S. Thus, the forward and rear surfaces 34, 36 and the upper and lower surfaces 38, 40 interchange positions and thus functionality.

Referring back to FIG. 3, in accordance with some embodiments of the subject matter of the present application, in a side view of the cutting insert 22 along the side axis S, the upper and lower surfaces 38, 40 can be substantially parallel and define a cutting insert height H, measured perpendicular to the insert longitudinal axis A. The cutting insert 22 has a maximum cutting insert length L, measured in a direction of the insert longitudinal axis A and between the longitudinal extremities of the cutting insert 22. The maximum cutting insert length L can be in the range H≤L≤2H.

In accordance with some embodiments of the subject matter of the present application, the forward and upper surfaces 34, 38 of the attached cutting insert 22 do not abut corresponding surfaces on the insert holder 24. That is to say, the forward and upper surfaces 34, 38 can be devoid of any abutment surfaces. By not having the upper surface 34 abut a corresponding surface on the insert holder 24, chips that are produced flow from the cutting insert's main cutting edge 42 along its rake surface 48 and do not engage any portion of the insert holder 24 adjacent the rake surface 48. This helps to avoid subjecting that portion of the insert holder 24 to abrasive wear.

The rear surface 36 includes an insert rear abutment surface 50 for abutting a corresponding surface on the insert holder 24. In accordance with some embodiments of the subject matter of the present application, the insert rear abutment surface 50 can be planar. The lower surface 40 includes an insert lower abutment surface 52, for abutting a corresponding surface on the insert holder 24. In accordance with some embodiments of the subject matter of the present application, the insert lower abutment surface 52 can be planar. The insert lower abutment surface 52 can extend longitudinally in the direction of the insert longitudinal axis A. As seen in FIG. 3, the insert rear and lower abutment surfaces 50, 52 which belong to the respective rear and lower surfaces 36, 40 adjacent to the second main cutting edge 42', form an obtuse abutment angle α with respect to each other. In accordance with some embodiments of the subject matter of the present application, optimally, the obtuse abutment angle α can be in the range 110°≤α≤125°. In a similar manner, the forward and upper surfaces 34, 38 adjacent the first main cutting edge 42 have corresponding abutment surfaces which also form an obtuse abutment angle α.

Figure 5:
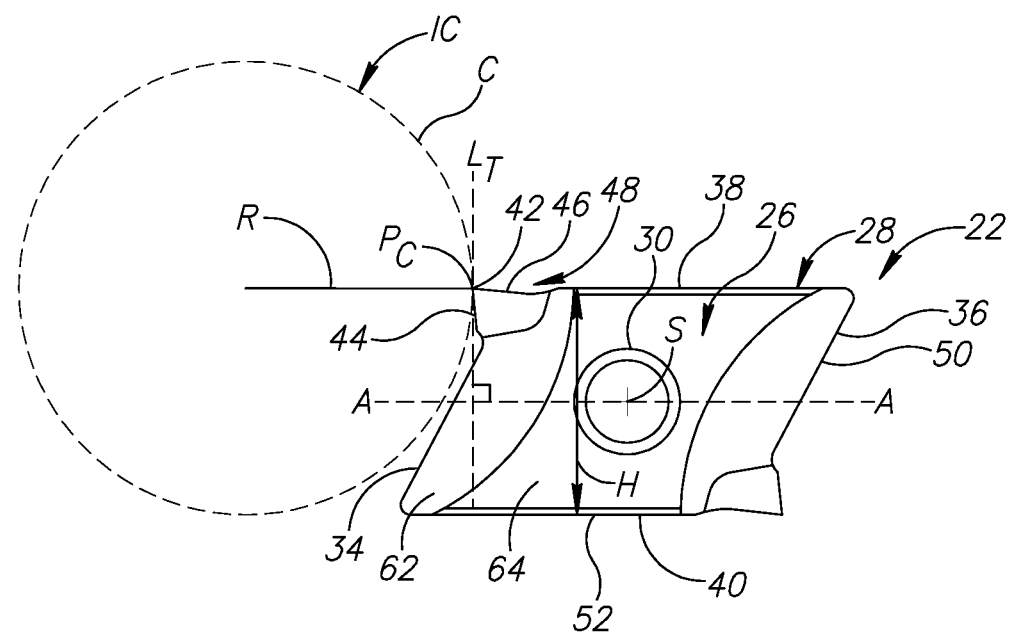
FIG. 5 is another side view of the cutting insert shown in FIG. 2.

In a side view of the cutting insert 22 along the side axis S, a relief surface line $L_R$ tangent to the relief surface 44 intersects the insert lower abutment surface 52. A main cutting edge line $L_{CE}$ oriented perpendicularly to the insert longitudinal axis A and passing through the main cutting edge 42 can intersect the insert lower abutment surface 52. That is to say, a point on the insert lower abutment surface 52 furthest from the rear surface 36 defines a first point P1 and in a side view of the cutting insert 22 along the side axis, the main cutting edge 42 can be offset in a direction towards the rear surface 36 relative to the first point P1, as measured along the insert longitudinal axis A. As seen in FIG. 5, an imaginary circle IC, that has a radius R which is greater than the cutting insert height H, and which is positioned such that its circumference C touches the main cutting edge 42 at a circumference point $P_C$ having a circle tangent line $L_T$ that is perpendicular to the insert longitudinal axis A, may not intersect the forward surface 34. Such a configuration advantageously allows the main cutting edge 42 to engage a workpiece, even though the main cutting edge 42 is offset in a direction towards the rear surface 36 relative to the first point P1.

Figure 4:
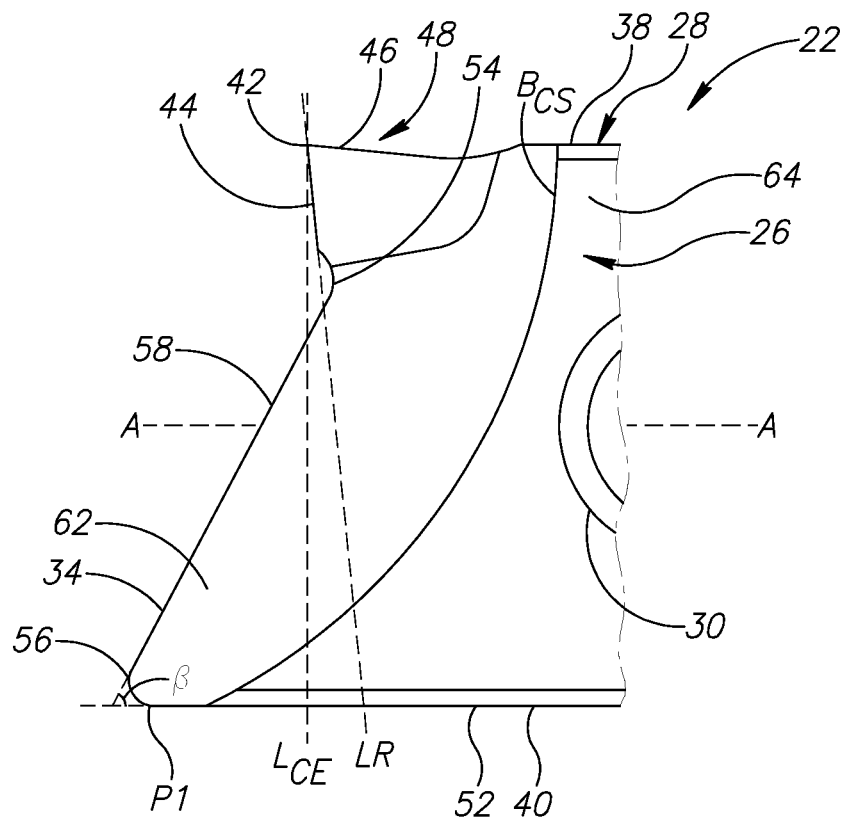
FIG. 4 is a detailed view of the cutting insert shown in FIG. 3.

Referring now to FIG. 4, in a side view of the cutting insert 22 along the side axis S, the forward surface 34 can include a forward concave portion 54, a forward convex portion 56 and a forward straight portion 58 extending therebetween, where the forward concave portion 54 is located adjacent the relief surface 44 and the forward convex portion 56 is located adjacent the lower surface 40. The relief surface line $L_R$ can intersect the forward straight portion 58 proximate the forward concave portion 54. The forward straight portion 58 can form an acute forward surface angle β with respect to the insert lower abutment surface 52. Optimally, the acute forward surface angle β can be in the range 55°≤β≤70°.

Referring now to FIG. 6, one of the side surfaces 26 (the "operative" side surface) includes an insert side abutment surface 60, for abutting a corresponding surface on the insert holder 24. In accordance with some embodiments of the subject matter of the present application, the insert side abutment surface 60 can be planar.

Figure 7:
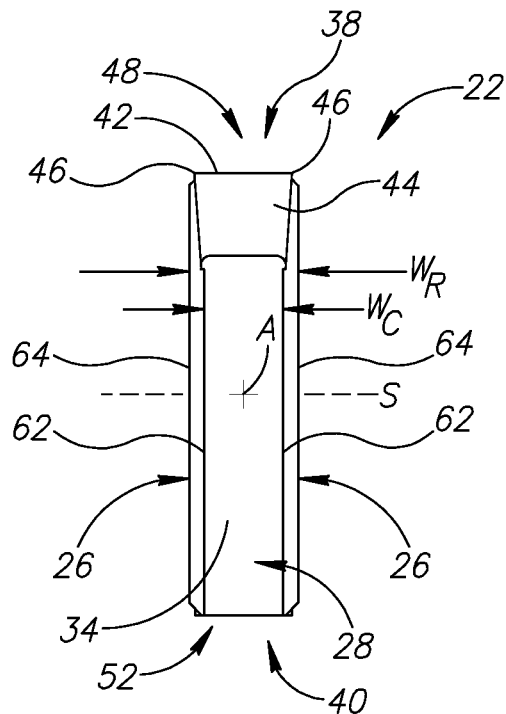
FIG. 7 is a front view of the cutting insert shown in FIG. 2.

Referring back to FIGS. 3 to 5, in accordance with some embodiments of the subject matter of the present application, each side surface 26 can include a side clearance surface 62 that extends between the upper and lower surfaces 38, 40 and that extends from a side raised surface 64 towards the forward surface 34. The insert through bore 30 can pass through the side raised surfaces 64. The insert side abutment surface 60 can be located on one of the side raised surfaces 64. As seen in FIGS. 6 and 7, the side clearance surface 62 is recessed relative to the side raised surface 64, as seen in a front view of the cutting insert 22. The clearance width $W_C$ of the cutting insert 22, as measured between the side clearance surfaces 62 along the side axis S, is less than the raised width $W_R$ of the cutting insert 22, as measured between the side raised surfaces 64 along the side axis S. In a side view of the cutting insert 22 along the side axis S, i.e. FIG. 3, a clearance surface boundary $B_{CS}$ of the side clearance surface 62 adjacent the side raised surface 64, on each side surface 26, can be convex in the direction of the side axis S. The purpose of the side clearance surfaces 62 is to permit the cutting insert 22 to engage a work piece and attain a depth of cut without any portion of the cutting insert 22 distal the main cutting edge 42 contacting the work piece.

The cutting insert 22 can have two-fold (180°) rotational symmetry about the side axis S. In a side view of the cutting insert 22 along the side axis S, the cutting insert 22 can be generally parallelogram-shaped. As seen in FIG. 3, the cutting insert's generally parallelogram-shape includes a short diagonal D1 connecting insert cutting corners 66 where the main cutting edges 42, 42' are located and the obtuse angle α is formed by adjacent peripheral surfaces, and a long diagonal D2 connecting insert non-cutting corners 65 where the acute forward surface angle β is formed by adjacent peripheral surfaces.

Figure 8:
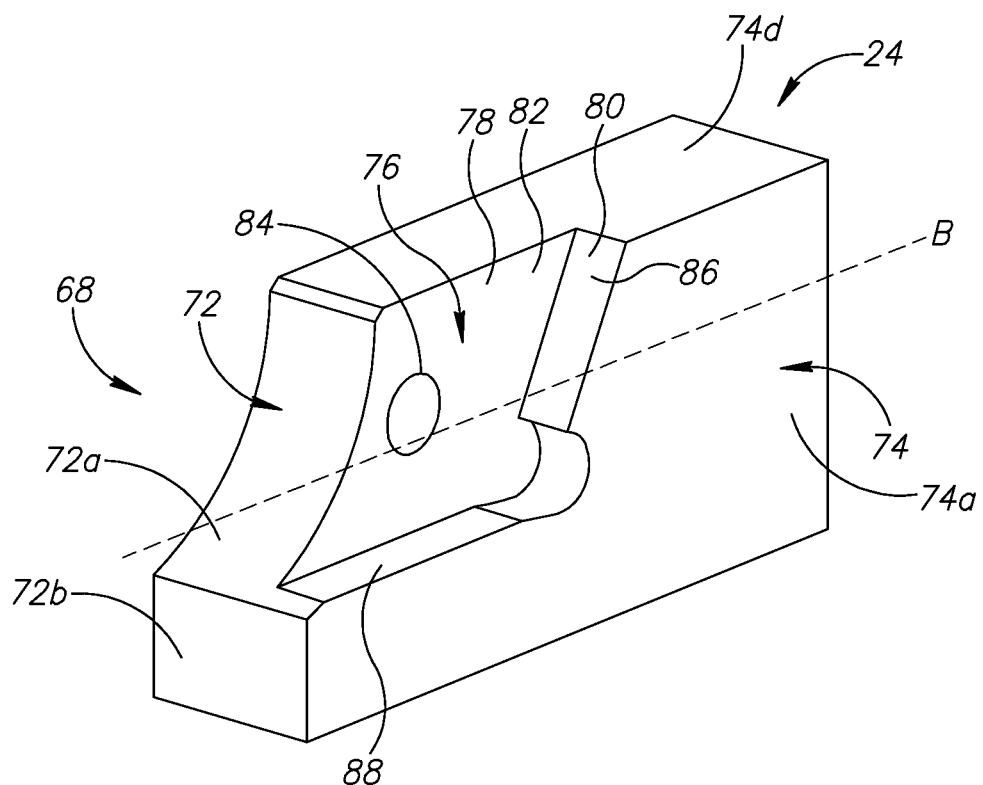
FIG. 8 is a perspective view of an insert holder shown in FIG. 2.
Figure 9:
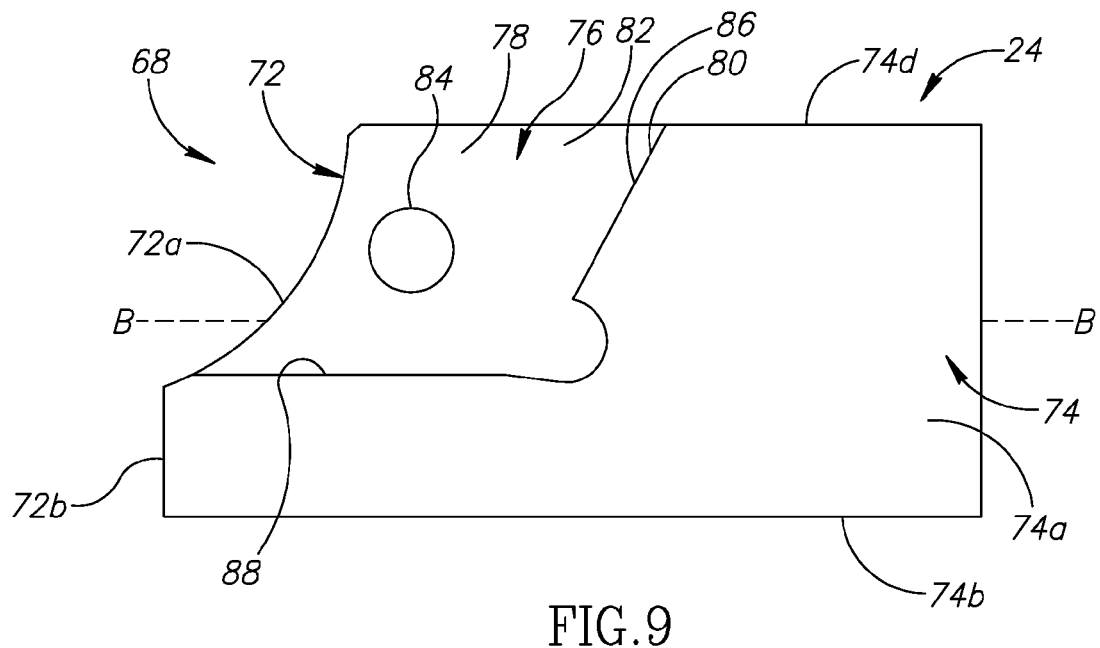
FIG. 9 is a side view of the insert holder shown in FIG. 2.

The cutting tool 20 includes the cutting insert 22, as described hereinabove, and the insert holder 24. Reference is now made to FIGS. 8 to 9, showing the insert holder 24, having a holder longitudinal axis B. The holder longitudinal axis B can extend in the same direction as the insert longitudinal axis A. The insert holder 24 has a holder forward end 68. The insert holder 24 includes a holder forward end surface 72, formed at the holder forward end 68, and a holder peripheral surface 74, where the holder peripheral surface 74 forms a circumferential boundary of the holder forward end surface 72. The holder forward end surface 72 can include a plurality, for example two, holder forward end sub-surfaces 72a, 72b. One of the holder forward end sub-surfaces 72a, 72b could be substantially planar and the other one of the holder forward end sub-surfaces 72a, 72b could be concave. However it will be understood that the holder forward end surface 72 could instead be completely concave, in which case there would only be one continuous surface.

Making particular reference to FIG. 8, the holder peripheral surface 74 can include a plurality, for example four, holder peripheral sub-surfaces 74a, 74b, 74c, 74d. However it will be understood that the holder peripheral surface 74 could instead be cylindrical, in which case there would only be one continuous surface.

An insert pocket 76 is recessed in the holder peripheral surface 74 and opens out to the holder forward end surface 72. The purpose of the insert pocket 76 is to accommodate the cutting insert 22 when removably attached to the insert holder 24. The insert pocket 76 includes a pocket side surface 78 and a pocket peripheral wall surface 80 oriented substantially perpendicularly thereto. The pocket side surface 78 includes a pocket side abutment surface 82, for abutting a corresponding surface on the cutting insert 22. In accordance with some embodiments of the subject matter of the present application, the pocket side abutment surface 82 can be planar. The pocket side surface 78 can include a threaded pocket bore 84. The threaded pocket bore 84 is designed for providing a means to removably attach the cutting insert 22 to the insert holder 24.

The pocket peripheral wall surface 80 includes pocket rear and lower abutment surfaces 86, 88, for abutting corresponding surfaces on the cutting insert 22. The pocket rear and lower abutment surfaces 86, 88 can be planar.

The cutting insert 22 is removably attached to the insert holder 24 by the fastening member 32. In accordance with some embodiments of the subject matter of the present application the fastening member 30 can be a screw, which is threadingly engaged with the threaded pocket bore 84.

Figure 10:
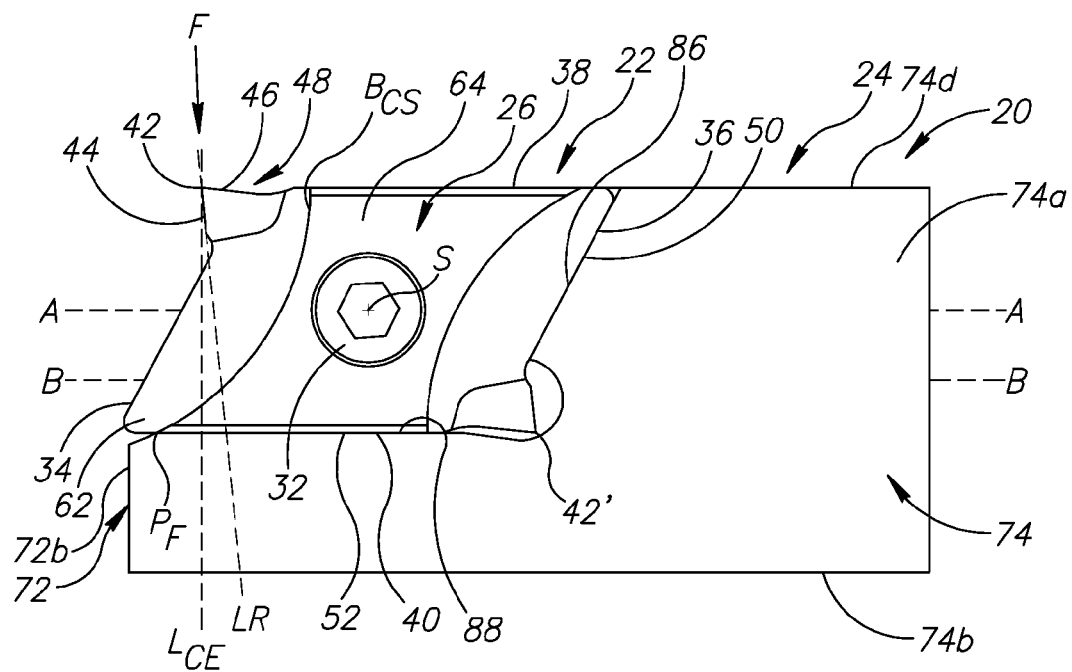
FIG. 10 is a first side view of the cutting tool shown in FIG. 1.
Figure 12:
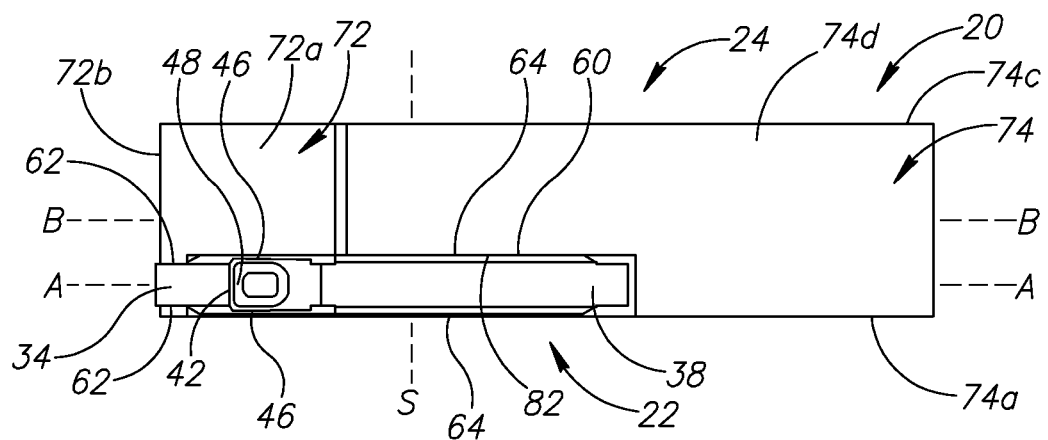
FIG. 12 is a plan view of the cutting tool shown in FIG. 1.
Figure 13:
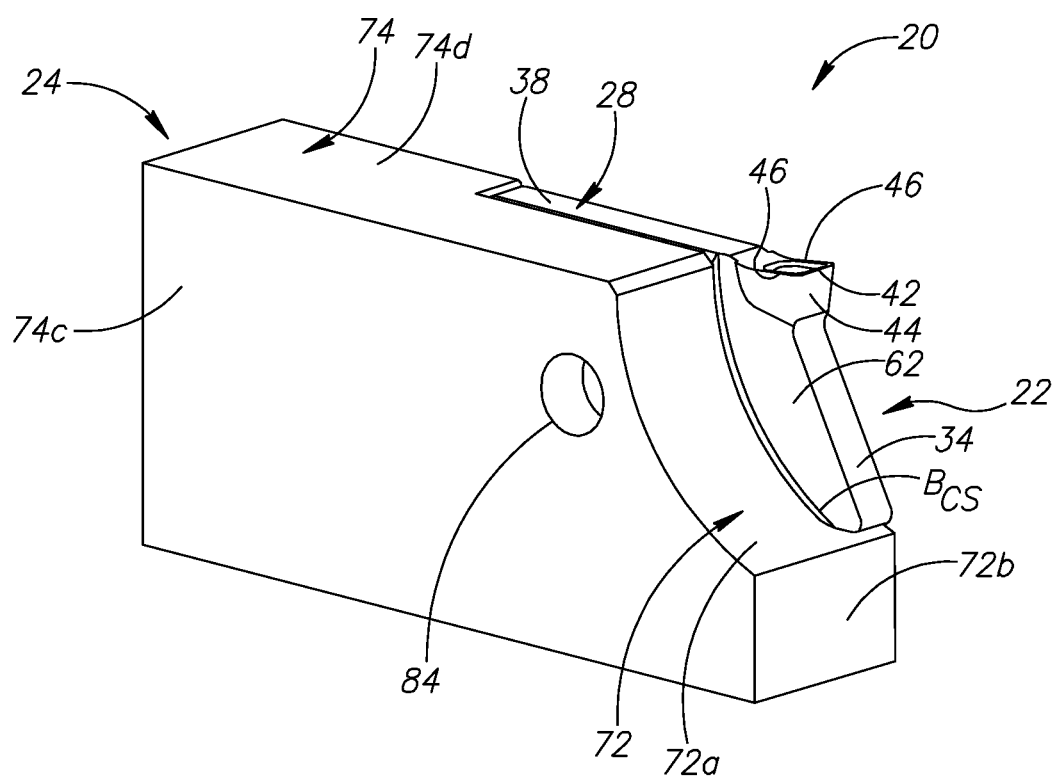
FIG. 13 is another perspective view of the cutting tool shown in FIG. 1.

As seen in FIGS. 10 and 12, in the assembled position of cutting tool 20, the pocket rear abutment surface 86 abuts the insert rear abutment surface 50, the pocket lower abutment surface 88 abuts the insert lower abutment surface 52, and the pocket side abutment surface 82 abuts the insert side abutment surface 60. Configuring the pocket lower abutment surface 88, the insert lower abutment surface 52, the pocket rear abutment surface 86, the insert rear abutment surface 50, the pocket side abutment surface 82 and the insert side abutment surface 60 to be planar, as disclosed above, provides improved surface contact.

In accordance with some embodiments of the subject matter of the present application, as best seen in FIG. 10, in a side view of the cutting tool 20 along the side axis S, the relief surface line $L_R$ can intersect the pocket lower abutment surface 88. The main cutting edge line $L_{CE}$, oriented perpendicularly to the insert longitudinal axis A and passing through the main cutting edge 42, can intersect the pocket lower abutment surface 88. Designing the main cutting edge line $L_{CE}$ to intersect the pocket lower abutment surface 88 advantageously guarantees that a cutting force F applied to the main cutting edge 42 when the cutting insert 22 engages the work piece is opposed by both the pocket rear and pocket lower abutment surfaces 86, 88.

Figure 11:
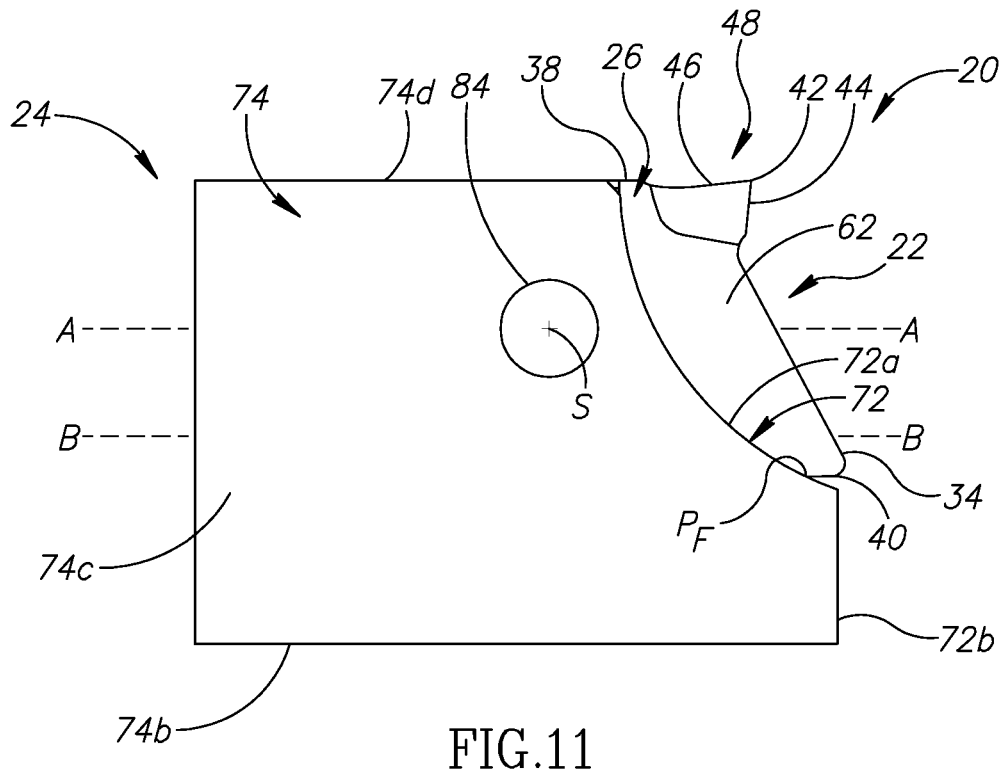
FIG. 11 is second side view of the cutting tool shown in FIG. 1.

In a side view of the cutting tool 20 along the side axis S, viewing the side surface 26 that includes the (hidden) insert side abutment surface 60, i.e. FIG. 11, the holder forward end surface 72 optionally does not overlap the side clearance surface 62. This advantageously allows the cutting insert 22 to achieve its maximum possible depth of cut, without the insert holder 24 impeding progress of the cutting tool 20 towards the work piece.

In the cutting tool 20, there is a forwardmost abutment point $P_F$ formed between the insert lower abutment surface 52 and the pocket lower abutment surface 88 furthest from the rear surface 36. In a side view of the cutting tool 20 along the side axis S, the main cutting edge 42 is offset in a direction towards the rear surface 36 relative to the forwardmost abutment point $P_F$, as measured along the insert longitudinal axis A. Stated differently, the forwardmost abutment point $P_F$ is offset in a direction away from the rear surface 36 relative to the main cutting edge 42, as measured along the insert longitudinal axis A, so that the pocket rear and lower abutment surface 86, 88 advantageously provide extended support along the entire length of the cutting insert 22.

A feature of the subject matter of the present application is that the cutting force F applied to the cutting insert 22 when the cutting insert 22 engages the work piece (a) urges the insert lower abutment surface 52 on the cutting insert 22 towards the pocket lower abutment surface 88 on the insert holder 24, and also (b) urges the insert rear abutment surface 50 on the cutting insert 22 towards the pocket rear abutment surface 86 on the insert holder 24. By such a configuration, the cutting insert 22 is urged into, as opposed to urged out of, the insert pocket 76 during metal cutting operations.

Yet another feature of the subject matter of the present application is that the insert pocket 76 advantageously provides a stable and rigid support for the cutting insert 22 during metal cutting operations.

By virtue of fact that the maximum cutting insert length L is in the range H≤L≤2H, cutting inserts 22 in accordance with the subject matter of the present application advantageously require less material to be manufactured compared with typical known grooving and parting cutting inserts which are removably attached to the insert holder 24 in a similar manner (i.e. with the fastening member 32 clamping the cutting insert 22 to the insert holder 24 through the insert through bore 30 that passes through the side surfaces 26 of the cutting insert 22).

Although the subject matter of the present application has been described to a certain degree of particularity, it should be understood that various alterations and modifications could be made without departing from the spirit or scope of the invention as hereinafter claimed.

What is claimed is:

1. A cutting insert (22) having an insert longitudinal axis (A), the cutting insert (22) comprising:
    opposing forward and rear surfaces (34, 36) and a peripheral surface (28) extending therebetween, the peripheral surface (28) comprising opposing side surfaces (26) connecting opposing upper and lower surfaces (38, 40); and
    an insert through bore (30) passing through the side surfaces (26) along a side axis (S); wherein:
        the forward and upper surfaces (34, 38) intersect to form a main cutting edge (42) having an associated relief surface (44) that extends therefrom in the forward surface (34);
        one of the side surfaces (26) comprises an insert side abutment surface (60);
        the rear surface (36) comprises an insert rear abutment surface (50);
        the lower surface (40) comprises an insert lower abutment surface (52); and
        the insert rear and lower abutment surfaces (50, 52) form an obtuse abutment angle (α) with respect to each other; wherein
            in a side view of the cutting insert (22) along the side axis (S), a relief surface line ($L_R$) tangent to the relief surface (44) intersects the insert lower abutment surface (52).

2. The cutting insert (22) according to claim 1, wherein the obtuse abutment angle (α) is in the range 110°≤α≤125°.

3. The cutting insert (22) according to claim 1, wherein the insert rear and lower abutment surfaces (50, 52) are planar.

4. The cutting insert (22) according to claim 1, wherein the insert side abutment surface (60) is planar.

5. The cutting insert (22) according to claim 1, wherein:
    the insert lower abutment surface (52) extends longitudinally in the direction of the insert longitudinal axis (A).

6. The cutting insert (22) according to claim 1, wherein
    in a side view of the cutting insert (22) along the side axis (S), a main cutting edge line ($L_{CE}$) oriented perpendicularly to the insert longitudinal axis (A) and passing through the main cutting edge (42) intersects the insert lower abutment surface (52).

7. The cutting insert (22) according to claim 1, wherein:
    in a side view of the cutting insert (22) along the side axis (S), the upper and lower surfaces (38, 40) are substantially parallel and define a cutting insert height (H), measured perpendicular to the insert longitudinal axis (A).

8. The cutting insert (22) according to claim 7, wherein:
    the cutting insert (22) has a maximum cutting insert length (L), measured in a direction of the insert longitudinal axis (A); and
    the maximum cutting insert length L is in the range H≤L≤2H.

9. The cutting insert (22) according to claim 7, wherein
    in a side view of the cutting insert (22) along the side axis (S), an imaginary circle (IC), having a radius (R) which is greater than the cutting insert height (H), and which is positioned such that its circumference (C) touches the main cutting edge (42) at a circumference point (E) having a circle tangent line ($L_T$) that is perpendicular to the insert longitudinal axis (A), does not intersect the forward surface (34).

10. The cutting insert (22) according to claim 1, wherein
    in a side view of the cutting insert (22) along the side axis (S), the forward surface (34) comprises a forward concave portion (54), a forward convex portion (56) and a forward straight portion (58) extending therebetween, the forward concave portion (54) being located adjacent the relief surface (44) and the forward convex portion (56) being located adjacent the lower surface (40).

11. The cutting insert (22) according to claim 10, wherein
    in a side view of the cutting insert (22) along the side axis (S), the relief surface line ($L_R$) intersects the forward straight portion (58) proximate the forward concave portion (54).

12. The cutting insert (22) according to claim 10, wherein
    in a side view of the cutting insert (22) along the side axis (S), the forward straight portion (58) forms an acute forward surface angle (β) with respect to the insert lower abutment surface (52).

13. The cutting insert (22) according to claim 12, wherein the acute forward surface angle β is in the range 55°≤β≤70°.

14. The cutting insert (22) according to claim 1, wherein the cutting insert (22) comprises two main cutting edges (42, 42').

15. The cutting insert (22) according to claim 14, wherein the cutting insert (22) has 180° rotational symmetry about the side axis (S).

16. The cutting insert (22) according to claim 1, wherein in a side view of the cutting insert (22) along the side axis (S):
    the cutting insert (22) is generally parallelogram-shaped; and the main cutting edge (42) is located at an insert cutting corner (66) of the cutting insert.

17. The cutting insert (22) according to claim 1, wherein:
each side surface (26) comprises a side clearance surface (62) extending between the upper and lower surfaces (38, 40) and extending from a side raised surface (64) towards the forward surface (34), the side clearance surface (62) being recessed relative to the side raised surface (64), in a front view of the cutting insert (22).

18. The cutting insert (22) according to claim 1, wherein in a side view of the cutting insert (22) along the side axis (S), a clearance surface boundary ($B_{CS}$) of the side clearance surface (62) adjacent the side raised surface (64), on each side surface (26), is convex in the direction of the side axis (S).

19. The cutting insert (22) according to claim 1, wherein the cutting insert (22) is one selected from a group consisting of a grooving insert, a threading insert, a profiling insert and a parting insert.

20. The cutting insert (22) according to claim 1, wherein the forward and upper surfaces (34, 38) are devoid of any abutment surfaces.

21. A cutting tool (20) comprising, in combination:
an insert holder (24), having a holder longitudinal axis (B); and
a cutting insert, in accordance with claim 1, removably attached to the insert holder (24).

22. The cutting tool (20) according to claim 21, wherein:
the insert holder (24) comprises:
  a holder forward end surface (72) and a holder peripheral surface (74) forming a circumferential boundary thereof; and
  an insert pocket (76) recessed in the holder peripheral surface (74) and opening out to the holder forward end surface (72), the insert pocket (76) comprising:
    a pocket side surface (78) and a pocket peripheral wall surface (80) oriented substantially perpendicularly thereto, the pocket side surface (78) comprising a pocket side abutment surface (82), and the pocket peripheral wall surface (80) comprising pocket rear and lower abutment surfaces (86, 88); wherein in an assembled position of the cutting tool (20):
      the pocket lower abutment surface (88) abuts the insert lower abutment surface (52), the pocket rear abutment surface (86) abuts the insert rear abutment surface (50) and the pocket side abutment surface (82) abuts the insert side abutment surface (60).

23. The cutting tool (20) according to claim 22, wherein the pocket side surface (78) comprises a threaded pocket bore (84) and the fastening member (32) is a screw.

24. The cutting tool (20) according to claim 22, wherein in a side view of the cutting tool (20) along the side axis (S), the relief surface line ($L_R$) intersects the pocket lower abutment surface (88).

25. The cutting tool (20) according to claim 22, wherein in a side view of the cutting tool (20) along the side axis (S), a main cutting edge line ($L_{CE}$) oriented perpendicularly to the insert longitudinal axis (A) and passing through the main cutting edge (42) intersects the pocket lower abutment surface (88).

26. The cutting tool (20) according to claim 22, wherein: the insert longitudinal axis (A) and the holder longitudinal axis (B) extend in the same direction.

27. The cutting tool (20) according to claim 22, wherein each side surface (26) comprises a side clearance surface (62) extending between the upper and lower surfaces (38, 40) and extending from a side raised surface (64) towards the forward surface (34), the side clearance surface (62) being recessed relative to the side raised surface (64), in a front view of the cutting insert (22); wherein
in a side view of the cutting tool (20) along the side axis (S), viewing the side surface (26) that comprises the insert side abutment surface (60), the holder forward end surface (72) does not overlap the side clearance surface (62).

28. The cutting tool (20) according to claim 22, wherein a cutting force (F) applied to the main cutting edge (42) when the cutting insert (22) engages a work piece is opposed by both the pocket rear and pocket lower abutment surfaces (86, 88).

29. A cutting tool (20) comprising, in combination:
a cutting insert (22) having an insert longitudinal axis (A), the cutting insert (22) comprising:
  opposing forward and rear surfaces (34, 36) and a peripheral surface (28) extending therebetween, the peripheral surface (28) comprising opposing side surfaces (26) connecting opposing upper and lower surfaces (38, 40); and
  an insert through bore (30) passing through the side surfaces (26) along a side axis (S); wherein:
    the forward and upper surfaces (34, 38) intersect to form a main cutting edge (42) having an associated relief surface (44) that extends therefrom in the forward surface (34);
    one of the side surfaces (26) comprises an insert side abutment surface (60);
    the rear surface (36) comprises an insert rear abutment surface (50);
    the lower surface (40) comprises an insert lower abutment surface (52); and
    the insert rear and lower abutment surfaces (50, 52) form an obtuse abutment angle (α) with respect to each other; and
an insert holder (24), having a holder longitudinal axis (B), comprising:
  a holder forward end surface (72) and a holder peripheral surface (74) forming a circumferential boundary thereof;
  an insert pocket (76) recessed in the holder peripheral surface (74) and opening out to the holder forward end surface (72), the insert pocket (76) comprising:
    a pocket side surface (78) and a pocket peripheral wall surface (80) oriented substantially perpendicularly thereto, the pocket side surface (78) comprising a pocket side abutment surface (82), and the pocket peripheral wall surface (80) comprising pocket rear and lower abutment surfaces (86, 88); wherein in an assembled position of the cutting tool (20):
    the cutting insert (22) is removably attached to the insert holder (24) by a fastening member (32);
    the pocket lower abutment surface (88) abuts the insert lower abutment surface (52), the pocket rear abutment surface (86) abuts the insert rear abutment surface (50) and the pocket side abutment surface (82) abuts the insert side abutment surface (60);
    a forwardmost abutment point ($P_F$) is defined between the insert lower abutment surface (52) and the pocket lower abutment surface (88) furthest from the rear surface (36); and
    in a side view of the cutting tool (20) along the side axis (S), the main cutting edge (42) is offset in a direction towards the rear surface (36) relative to the forwardmost abutment point ($P_F$), as measured along the insert longitudinal axis (A).

30. An indexable cutting insert (22) having an insert longitudinal axis (A), the cutting insert (22) comprising:

opposing forward and rear surfaces (34, 36) and a peripheral surface (28) extending therebetween, the peripheral surface (28) comprising opposing side surfaces (26) connecting opposing upper and lower surfaces (38, 40); and an insert through bore (30) passing through the side surfaces (26) along a side axis (S) around which the cutting insert has 180° rotational symmetry; wherein:

the forward and upper surfaces (34, 38) intersect at a first insert cutting corner (66) to form a first main cutting edge (42) having an associated rake surface (48) in the upper surface (34) and an associated relief surface (44) in the forward surface (34);

the rear and lower surfaces (36, 40) intersect at a second insert cutting corner (66) to form a second main cutting edge (42') having an associated rake surface (48) in the lower surface (36) and an associated relief surface (44) in the rear surface (34);

the cutting insert has a generally parallelogram-shape in a view along the side axis (S); and the generally parallelogram-shape includes a short diagonal (D1) connecting the insert cutting corners (66) and a long diagonal (D2) connecting insert non-cutting corners (65).

\* \* \* \* \*